United States Patent [19]

Gnauck et al.

[11] Patent Number: 5,400,165

[45] Date of Patent: * Mar. 21, 1995

[54] OPTICAL COMMUNICATION USING DISPERSION-INDUCED FM TO AM CONVERSION WITH NONLINEARITY-INDUCED STABILIZATION

[75] Inventors: Alan H. Gnauck, Middletown; Christian Kurtzke, Hazlet, both of N.J.

[73] Assignee: AT&T Corp., Murray Hill, N.J.

[ * ] Notice: The portion of the term of this patent subsequent to Nov. 15, 2011 has been disclaimed.

[21] Appl. No.: 120,092

[22] Filed: Sep. 10, 1993

[51] Int. Cl.[6] .......................... H04B 10/00; H01S 3/00
[52] U.S. Cl. ................................... 319/161; 319/160; 319/173; 319/179; 319/182; 319/326; 319/338; 319/341; 385/122; 372/6
[58] Field of Search ................ 359/134, 154, 160-161, 359/173-174, 176, 179, 182, 188, 195, 326, 334, 338, 341; 372/6, 21; 385/122

[56] References Cited

U.S. PATENT DOCUMENTS 5,117,303  5/1992  Desurvire et al. ............... 359/179
5,243,610  9/1993  Murata ............................. 372/21

FOREIGN PATENT DOCUMENTS 4299622  10/1992  Japan .............................. 359/188

OTHER PUBLICATIONS

Petermann et al., "Large Signal Analysis of FM-AM Conversion in Dispersive Optical Fibres and its Application to PCM Systems" Electronics Letters, 5th Dec. 1991, vol. 27 No. 25, pp. 2347-2348.

Yoshida et al., "Influence of Amplitude Modulation Induced by LD Direct Modulation on FM Signal Transmission" IEEE Photonics Technology Letters, vol. 2, No. 12, Dec. 1990, pp. 929-931.

Lidgrad et al., "Generation and Cancellation of 2nd Order Harmonic Distortion in Analog Optical Systems by Interferometric FM-AM Conversion" IEEE Photonics Technology Letters, vol. 2, No. 7, Jul. 1990, pp. 519-521.

Bochove, Erik J. and de Carvalho, Ester M., "Conversion Of A Wideband Frequency-Modulated Signal To Amplitude Modulation Through Dispersion in an Optical Fiber," Optics Letters, vol. 7, No. 3, Mar. 1982, pp. 139-141.

Bochove, Erik J., de Carvalho, Ester M. and Filho, Jose Ellis Ripper, "FM-AM Conversion By Material Dispersion In An Optical Fiber," Optics Letters, vol. 6, No. 2, Feb. 1981, pp. 58-60.

Kikuchi, Kazuro, and Lorattanasane, Chaloemphon, "Compensation For Pulse Waveform Distortion In Ultra-Long Distance Optical Communication Systems By Using Nonlinear Optical Phase Conjugator," Optical Amplifiers and Their Applications, 1993 Technical Digest, Series vol. 14, Jul. 4-6, 1993, Yokohama, Japan, pp. 22-25.

(List continued on next page.)

Primary Examiner—Herbert Goldstein
Assistant Examiner—Kinfe-Michael Negash

[57] ABSTRACT

An optical communication system and method are provided which utilize dispersion-induced FM to AM conversion with nonlinearity-induced AM stabilization. The system and method utilize a frequency modulated optical signal transmitter, a fiber span, an optical receiver which receives the transmitted optical signal and detects an AM signal resulting from dispersion-induced energy overlaps and voids in the optical signal, and one or more in-line amplifiers spaced within the optical fiber span. By adjusting the number, position and/or output power levels of the in-line amplifiers, stabilization of the energy voids and overlaps and resulting AM signal can be achieved, yielding a substantial increase in achievable transmission distance at a given bit rate.

29 Claims, 5 Drawing Sheets

OTHER PUBLICATIONS

Gnauck, A. H., Mazurczyk, M., and Tkach, R. W., "Interplay Of Chirp And Self Phase Modulation In Dispersion-limited Optical Transmission Systems," Sep. 1993 presented at the ECOC '93, Montreux, Switzerland, Paper Tu C4.4.

Gnauck, A. H., Jopson, R. M., and Derosier, R. M., "10-Gb/s 360-km Tansmission Over Dispersive Fiber Using Midsystem Spectral Inversion," IEEE Photonics Technology Letters, vol. 5, No. 6, Jun. 1993, pp. 663-666.

Ogata, T., Nakaya, S., Aoki, Y., Saito, T., and Henmi, N., "Long-distance, Repeaterless Transmission utilizing Stimulated Brillouin Scattering Suppression and Dispersion Compensation," 4th Optoelectronics Conference Technical Digest, Jul. 1992, pp. 104-105.

Wedding, B., "New Method For Optical Transmission Beyond Dispersion Limit," Electronics Letters, vol. 28, No. 14, Jul. 2, 1992, pp. 1298-1300.

Wedding, B., Franz, B., Junginger, B., Clesca, B., and Bousselet, P., "Repeterless Optical Transmission At 10 Gbit/s Via 182 km Of Standard Singlemode Fibre Using A High Power Booster Amplifier," Electronics Letters, vol. 29, No. 17, Aug. 19, 1993, pp. 1498-1500.

Wedding, B. and Franz, B., "Unregenerated Optical Transmission At 10 Gbit/s Via 204 km Of Standard Singlemode Fibre Using A Directly Modulated Laser Diode," Electronics Letters, vol. 29, No. 4, Feb. 18, 1993, pp. 402-404.

Yariv, Amnon, Fekete, Dan and Pepper, David M., "Compensation for Channel Dispersion by Nonlinear Optical Phase Conjugation," Optics Letters, vol. 4, 1979, pp. 52-54.

OPTICAL COMMUNICATION USING DISPERSION-INDUCED FM TO AM CONVERSION WITH NONLINEARITY-INDUCED STABILIZATION

BACKGROUND OF THE INVENTION

1. Field of the Invention

The present invention relates generally to improvements in optical communication systems. More particularly, the present invention relates to optical communication using FM to AM conversion induced by fiber chromatic dispersion.

2. Description of the Prior Art

Optical communication typically involves transmitting high bit rate digital data over silica glass fiber by modulating a laser or other optical source. Glass fibers have a very broad bandwidth, on the order of 40,000 THz, and can therefore in theory support total data rates on the order of 20,000 Tbits/sec. However, the practical fiber transmission capability is limited by system constraints, among the most important of which are the chromatic dispersion and nonlinearities of the optical fiber itself. Although optical fiber also attenuates the transmitted signal, at a rate of about 0.2 dB per km, the development of erbium-doped fiber amplifiers (EDFAs) has essentially eliminated fiber attenuation as an obstacle to achieving longer transmission distances.

Chromatic dispersion, often simply called dispersion, refers to a phenomenon in which the speed of an optical signal through the fiber varies as a function of the optical signal frequency or wavelength in standard single-mode fibers. For wavelengths below about 1.3 $\mu$m, longer wavelengths travel faster than shorter ones, and the resulting dispersion is commonly referred to as normal dispersion. Above 1.3 $\mu$m, shorter wavelengths travel faster than longer ones, and the dispersion is referred to as anomalous dispersion. Dispersion is typically expressed in units of picoseconds per kilometer-nanometer (ps/km-nm), indicating the number of picoseconds a pulse with a bandwidth of 1 nanometer will spread in time by propagating over 1 kilometer of fiber.

One important fiber nonlinearity is the Kerr effect, in which the index of refraction increases with the intensity of the applied optical signal. Changes in the fiber index of refraction modulate the phase of a signal passing through the fiber and thereby impose a frequency chirp which redistributes the signal frequency spectrum. This phenomenon is known as self-phase modulation in single channel systems in which the optical signal modulates itself. In multi-channel systems, in which one signal causes modulation of other signals, the phenomenon is referred to as either cross-phase modulation or four-photon mixing. Lower frequencies are placed at the leading edge of an optical signal pulse and higher frequencies are placed toward the trailing edge. Changes in frequency distribution are translated to phase modulation by the fiber dispersion. Chromatic dispersion and the Kerr effect therefore both lead to increasing optical signal distortion as a function of transmission distance. For long distance communication over optical fiber, therefore, dispersion and nonlinearities must be controlled, compensated or suppressed.

A dispersion and nonlinearity control technique, currently used in terrestrial and transoceanic optical fiber transmission, is electronic regeneration. Repeaters are spaced at appropriate locations along the transmission path to electronically detect, regenerate and retransmit the optical signal before the signal distortion becomes excessive. Electronic regeneration, however, limits the maximum achievable data rate to that of the electronic hardware, rather than that of the wider bandwidth optical fiber. In addition, repeaters are expensive to build and maintain, do not permit flexible system upgradability, and must be spaced at relatively short intervals along the fiber to effectively control optical signal distortion.

A number of repeaterless compensation techniques have also been developed. One such technique involves solitons, which are optical signal pulses having a well-defined amplitude, pulse width and peak power for a given anomalous dispersion value, such that self-phase modulation due to the Kerr nonlinearity and anomalous chromatic dispersion interact to stabilize the pulse shape. A soliton maintains its shape due to this interplay between dispersion and nonlinearity, and can therefore travel greater distances without regeneration. However, soliton systems also suffer from a number of significant drawbacks, including timing jitter and the need for sliding frequency filters to extend the bit rate-distance product beyond approximately 100 Tbits/s-km.

Another demonstrated compensation technique makes use of midsystem optical phase conjugation to compensate for first order dispersion. Because the phase conjugate of an optical pulse is a time reversal of the pulse, midspan optical phase conjugation allows the first order chromatic distortion of the first half of a fiber span to be eliminated by the identical distortion produced as the conjugated signal propagates along the second half. See A. Yariv, D. Fekete and D. Pepper, "Compensation for channel dispersion by nonlinear optical phase conjugation", Optics Letters, vol. 4, pp. 52–54, 1979; K. Kikuchi and C. Lozattanasane, "Compensation for Pulse Waveform Distortion in Ultra-Long Distance Optical Communication Systems by Using Nonlinear Optical Phase Conjugation," 1993 Technical Digest Series Volume 14, Conference Jul. 4–6, 1993, Yokohama, Japan. Midsystem optical phase conjugation has extended the bit rate distance product achievable in the anomalous dispersion region at 1.5 $\mu$m wavelength of the conventional single mode fiber which makes up much of the world's existing fiber communication channels See A. Gnauck, R. Jopson and R. Derosier, "10 Gb/s 360 km Transmission over Dispersive Fiber Using Midsystem Spectral Inversion", IEEE Photonics Technology Letters, vol. 5, no. 6, June 1993.

Each of the above discussed techniques involve increasing fiber optic transmission distance by controlling or compensating dispersion and/or nonlinearities. However, it has also been recognized that chromatic dispersion produces an FM to AM conversion effect which can facilitate bit detection and thereby extend transmission distance without controlling or compensating dispersion. The dispersion causes shifting of adjacent signal components of different wavelengths, resulting in either energy voids or energy overlaps at the bit transitions. Constructive interference in an overlap causes a positive peak in the optical signal, while a void produces a negative peak. These positive and negative peaks represent an AM signal which may be detected to reproduce the original bit stream. The peaks are readily detected even when corresponding FM or AM data would have been excessively distorted by fiber dispersion effects. See E. Bochove, E. de Carvallo and J. Filks, "FM-AM conversion by material dispersion in an optical fiber," Optics Letters, Vol 6, No. 6, pp. 58–60, February 1981. It is therefore possible to go beyond the linear dispersion limit for either FM or AM modulated systems alone.

Demonstrated optical communication techniques using FM to AM conversion have an upper limit, for 10 Gbit/sec transmission over fiber with a dispersion of 17 ps/km-nm at 1.5 μm wavelengths, of about 151 km without in-line amplification, and 204 km with one in-line optical amplifier. See B. Wedding and B. Franz, "Unregenerated Optical Transmission at 10 Gbit/sec . . . " Electronics Letters, Vol. 29, No. 4, Feb. 18, 1993. Thus, a bit rate distance product of about 2 Tbit/s-km is possible using available FM to AM conversion techniques. The present upper limit is primarily due to the effect of dispersion on the energy voids and overlaps. In addition, the effects of nonlinearities in the fiber have not been taken into account in designing existing FM to AM conversion systems. Since the FM to AM conversion process itself is entirely linear, nonlinearities such as self-phase modulation due to the Kerr effect have not been thought to play a role.

As an alternative to fiber optic systems using regenerative repeaters, solitons or optical phase conjugation, FM to AM conversion is an important technique. It is particularly useful for existing terrestrial intercity fiber optic links, which presently are generally made up of fiber having a chromatic dispersion of about 17 ps/nm-km at 1.55 μm. Important advantages of FM to AM conversion over other available techniques for increasing dispersion-limited transmission distance include reduced hardware complexity and system cost, as well as ease of implementation and maintenance. Furthermore, FM to AM conversion is better suited to most existing terrestrial links than either soliton transmission or optical phase conjugation. Soliton transmission over terrestrial fiber would require prohibitively high optical signal amplitudes to generate sufficient Kerr nonlinearity to offset 17 ps/nm-km of dispersion. Optical phase conjugation performs best over fiber which has normal, or negative, dispersion values at the optical signal wavelengths. In addition, the spacing of fiber amplifiers in a terrestrial link is often dictated by terrain, and may thus fail to satisfy the lossless line approximation required for effective dispersion compensation using phase conjugation. Since soliton transmission or phase conjugation compensation may not be suitable, and available FM to AM techniques are limited to a transmission distance of about 200 km at 10 Gbits/sec, regenerative repeaters typically must be used in intercity fiber links covering distances greater than 200 km.

As is apparent from the above, a need exists for an improved optical communication systems based on FM to AM conversion. The improved system should take advantage of fiber nonlinearities in order to stabilize the energy voids and overlaps resulting from FM to AM conversion. Furthermore, the improved system should provide a substantial increase in bit rate distance product over presently available systems, without significant additional design, hardware or maintenance costs.

SUMMARY OF THE INVENTION

The present invention provides a method of and apparatus for optimizing FM to AM conversion in an optical communication system. The method and apparatus of the present invention are particularly well-suited for extending repeaterless transmission distance over existing terrestrial fiber links. The method includes the steps of providing an optical signal transmitter at one end of an optical fiber span to supply a frequency modulated optical signal to the fiber span; providing an optical signal receiver at the other end of the optical fiber span to receive the frequency modulated optical signal after it propagates through the span; providing one or more in-line amplifiers within the optical fiber span in positions between the transmitter and the receiver; demodulating the optical signal entering the receiver by detecting amplitude modulation on the optical signal resulting from fiber dispersion-induced energy voids and overlaps in the optical signal; and adjusting the positioning of the in-line amplifiers to stabilize the energy voids and overlaps in the optical signal and thereby improve detection of amplitude modulation in the receiver.

In accordance with one aspect of the present invention, the method includes the additional step of adjusting the output power of one or more of the in-line amplifiers to further stabilize the dispersion-induced optical signal energy voids and overlaps and thereby further improve the detection thereof. The invention thus provides two distinct mechanisms for using fiber nonlinearities to extend transmission distance in systems using FM to AM conversion: adjusting amplifier spacing within the fiber span and adjusting the output power of the amplifiers within the span. Maximum improvement in transmission distance for a given bit rate will be obtained by adjusting both the amplifier spacing and the amplifier output power.

In accordance with another aspect of the present invention, an optimized communication system for non-regenerated optical transmission over a distance of about 300 km is provided. The optimized communication system includes desired amplifier spacings and power levels for maximizing transmission distances at a data rate of 10 Gbits/sec. Several alternative amplifier spacings are also provided in order to improve implementation flexibility. Each provides an improvement over existing FM to AM conversion techniques, which are limited to a transmission distance of about 200 km for transmission of data at a 10 Gbits/sec data rate.

As a feature of the present invention, the benefits of FM to AM conversion are extended to higher bit rate distance products. For example, optical communication at 10 Gbit/s is made possible over fiber links of 300 km or more. The increased transmission distance allows for non-regenerated optical communication over a greater range of intercity links, leading to increased system flexibility, as well as reduced system hardware and maintenance costs.

As another feature of the present invention, the dispersion-induced peaks resulting from FM to AM conversion are stabilized by taking advantage of fiber nonlinearities. System performance is therefore improved regardless of the transmission distance or data rate. Adjustments in optical signal amplitude are made by varying the number, spacing and output power of in-line optical amplifiers. The effects of nonlinearities are accounted for and utilized to improve system capacity without adding significant design, hardware or maintenance costs to the optical system itself.

The above-discussed features, as well as additional features and advantages of the present invention, will become apparent by reference to the following detailed description and accompanying drawings.

DETAILED DESCRIPTION

The present invention provides techniques for optimizing FM to AM conversion communications system by exploiting nonlinearities within the optical fiber. Although the following detailed description illustrates the utility of the present invention primarily by reference to a particular optical communication system, it should be understood that this is by way of example and not limitation. The present invention will also provide advantages in other communication systems utilizing FM to AM conversion.

Figure 1A:
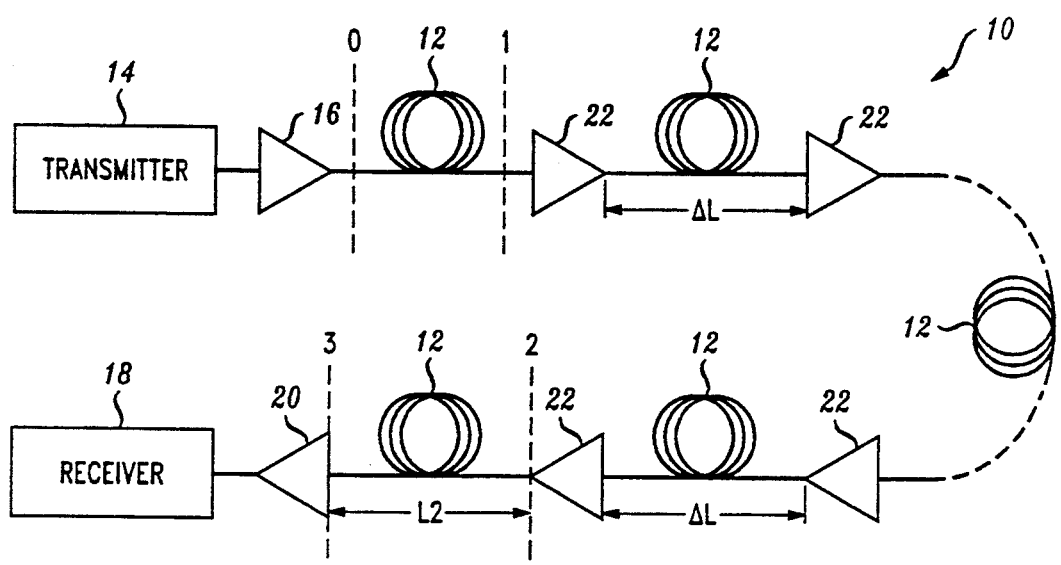
FIG. 1(a) is a schematic diagram of an optical communication system in accordance with the present invention.

FIG. 1(a) is a schematic diagram of an optical communication system in accordance with the present invention. The exemplary system shown includes an optical fiber span 10 having several discrete fiber lengths 12. The fiber span 10 includes the entire communications path from the dashed line labelled "0" to the dashed line labelled "3". The optical fiber in the span is either single or multi-mode fiber and has a dispersion of about 15 to 20 ps/km-nm at 1.5 $\mu$m wavelengths, corresponding to the dispersion of most existing terrestrial fiber optic communication links. An optical signal transmitter 14 supplies a frequency modulated optical signal to fiber span 10. Digital data is frequency modulated onto an optical carrier signal by, for example, frequency-shift keying the optical signal frequency. With frequency-shift keyed (FSK) frequency modulation, a different optical signal frequency is used to represent each of the two logic states of the digital data. A booster amplifier 16 may be utilized to amplify the transmitter output power to a level of about 10 to 20 mW, suitable for driving fiber span 10. The frequency modulated optical signal propagates along the fiber span 10 to an optical receiver 18. A pre-amplifier 20 may be placed between the fiber span 10 and the input of receiver 18 to provide additional amplification prior to detection as well as to improve the signal to noise performance of the receiver 18. Receiver 18 demodulates the digital data carried by the frequency modulated optical signal by detecting amplitude modulation resulting from the dispersion-induced voids and overlaps at the bit transitions. The fiber span 10 includes a plurality of in-line amplifiers 22 for overcoming the approximately 0.2 db/km attenuation loss within the fiber and stabilizing the gaps and overlaps as will be discussed below. The amplifiers 22 are preferably erbium-doped fiber amplifier (EDFAs). Other types of amplifiers, including but not limited to semiconductor laser amplifiers and fiber Raman amplifiers, could also be used.

Alternative frequency modulation techniques could also be used in the optical communication system of the present invention. For example, minimum-shift keyed (MSK) modulation, to be discussed in greater detail below, could be used in place of large deviation index FSK modulation. In addition, certain non-standard types of frequency modulation may also be used. For example, a different frequency distribution as a function of wavelength could be used to represent each data level. One embodiment could use a frequency ramp function to represent the logic high level, and a frequency step function to represent the logic low level. Many other variations in the type of frequency modulation could be made to optimize void and overlap stabilization in a particular application.

Figure 1B:
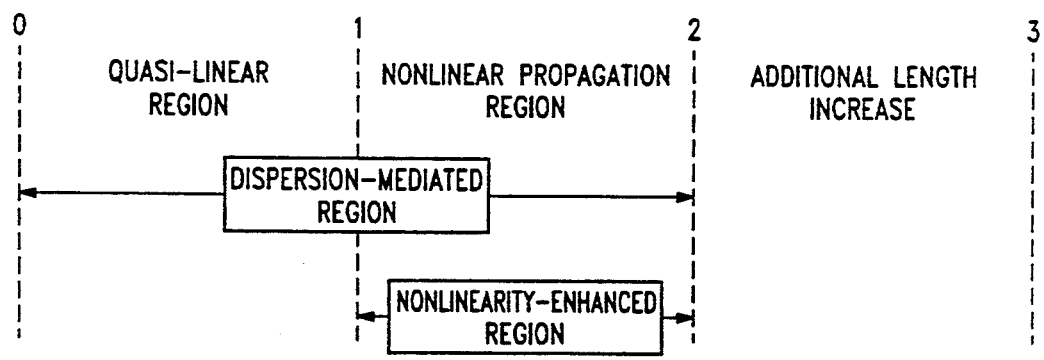
FIG. 1(b) is a qualitative illustration of the operating regions of the system shown in FIG. 1(a).

For purposes of illustrating the present invention, the fiber span shown in the exemplary system of FIG. 1(a) may be divided into distinct operating regions along the dotted lines 0, 1, 2 and 3. FIG. 1(b) is a qualitative illustration of these operating regions. Within the region from line 0 to line 1, the optical system distortion is dominated by linear dispersion-induced FM to AM conversion. Within this region, the effect of nonlinearities on overall system performance is very limited because nonlinearity alone, without the effect of accumulated dispersion, will produce only a relatively constant optical signal phase shift which does not significantly degrade performance. Variation in optical signal power level within this region therefore has only a slight impact on achievable transmission distance. Because the dispersion induced linear effects dominate within this region, it will be referred to as the quasi-linear region.

The second distinct operating region is the portion of the fiber span between dotted lines 1 and 2. This region is characterized by increasing importance of the nonlinear effects as a result of increasing accumulated dispersion within the fiber. Within this region the Kerr effect must be taken into account. Due to the increasing accumulated dispersion, the performance of the system is increasingly sensitive to optical signal amplitude. This is because the frequency redistribution resulting from the Kerr nonlinearity will produce an increasingly larger phase distortion as fiber accumulated dispersion increases. Within this region nonlinear effects may be controlled by adjusting amplifier spacing $\Delta L$ and output power in accordance with the present invention. Because the nonlinearities are a function of optical signal amplitude, adjustments in amplification and signal power will influence the interplay between first-order dispersion and fiber nonlinearities such as self-phase modulation. The first and second operating regions together may be referred to as a single dispersion-mediated region since first order linear dispersion effects are utilized within both of these regions to produce the desired FM to AM conversion. However, the second region may also be referred to as a nonlinearity-enhanced region because the effects of fiber nonlinearities are used within this region to stabilize voids and overlaps at the receiver.

A third operating region, between lines 2 and 3, may be utilized in certain systems. In this region, an additional length L2 of fiber is added to the original span length in order to increase the total fiber span length and thereby achievable bit rate distance product. The additional length L2 is added if, after optimizing the amplifier output power and spacing within the nonlinear propagation region, the optical signal quality is better than that required by the receiver. In such a situation, the maximum transmission distance may be increased for a given data rate by simply adding the additional fiber length. The additional fiber length L2 adversely affects signal quality, and should therefore be limited to a length which produces the signal quality at the receiver required for a desired level of system performance. In other words, the additional length may be added if the interplay between fiber nonlinearity and dispersion improves the signal quality beyond the required signal quality for the system. As a result, the amplifier spacings and amplifier output powers in a system optimized for a given length may be used in a system of a longer length by simply adding an additional length of fiber, provided signal quality requirements are met despite the additional length.

Figure 2A:
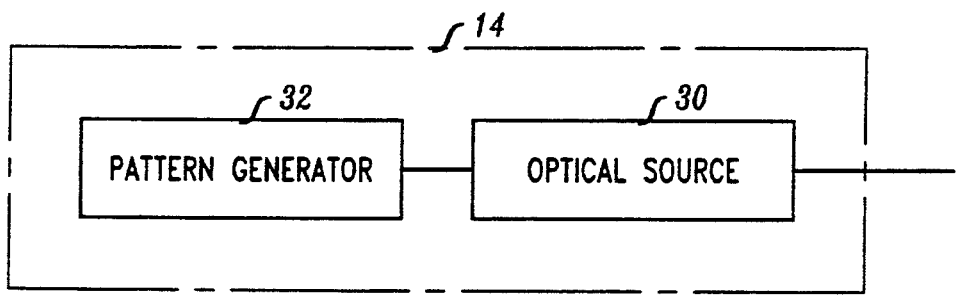
FIG. 2(a) is a block diagram of a first exemplary transmitter suitable for use in the system of FIG. 1(a).

FIG. 2 illustrates in greater detail the transmitter and receiver hardware. FIG. 2(a) is a block diagram of an exemplary optical transmitter suitable for use in the present invention. Transmitter 14 includes an optical source 30 directly driven by a pattern generator 32. Optical source 30 may be a single mode distributed feedback (DFB) laser, as shown, or any other type of optical source suitable for direct modulation, including, for example, a distributed Bragg (DBR) laser. Pattern generator 32 serves as a digital data source which directly FSK modulates optical source 30 to produce a frequency modulated optical signal. Pattern generator 32 is used for performing bit error rate tests on the fiber span, generating eye diagrams, or otherwise testing the quality of the fiber span. The significance of eye diagrams as a gauge of the system performance will be described below. The digital data pattern generated in the transmitter can be recognized at the receiver and used to synchronize equipment such as a bit error rate test set. Under actual use, the pattern generator 32 is replaced by a digital data source representing digitally encoded information to be transmitted across the fiber span.

Figure 2B:
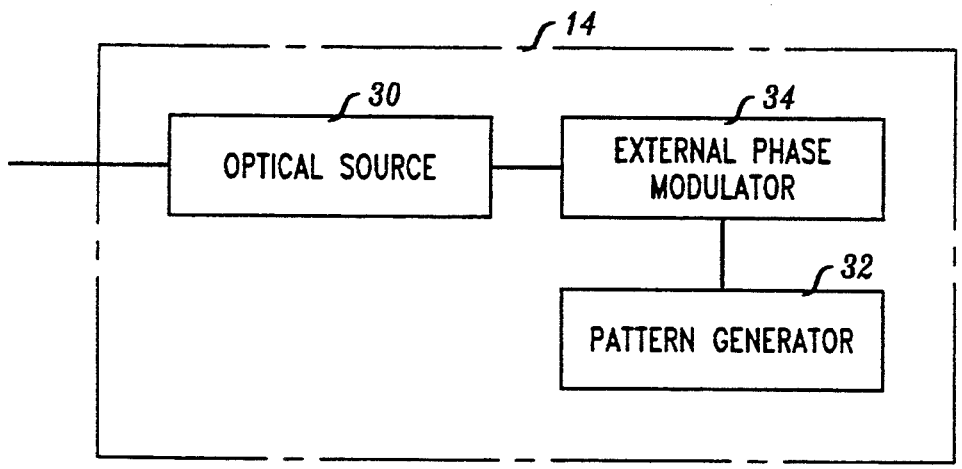
FIG. 2(b) is a block diagram of a second exemplary transmitter suitable for use in the system of FIG. 1(a).

An alternative to direct modulation of the optical source is shown in FIG. 2(b). In this embodiment, transmitter 14 includes an optical source 30 and pattern generator 32, as in the previously described embodiment. However, an external phase modulator 34 is used here in place of direct optical source modulation. The pattern generator 32 drives external modulator 34 to produce a signal phase modulated at the transmission data rate. This phase modulated signal drives the optical source to produce a frequency modulated optical signal. For example, a linear phase modulation, with a positive slope corresponding to logic high levels and a negative slope corresponding to a logic low levels, will produce a frequency modulated optical signal.

Figure 2C:
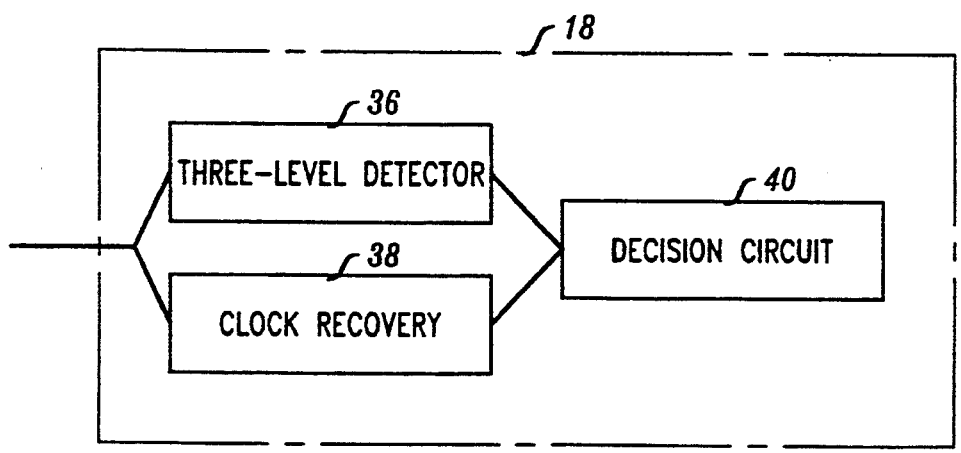
FIG. 2(c) is a block diagram of an exemplary receiver suitable for use in the system of FIG. 1(a).

FIG. 2(c) shows an exemplary receiver 18 in greater detail. In the embodiment shown, the receiver 18 includes a three-level detector 36 and a clock recovery circuit 38, both of which drive a decision circuit 40. The level detector 36 converts a three level FM to AM converted optical signal to a two-level digital signal. The three levels of the input optical signal include the dispersion-induced energy overlaps, the dispersion-induced energy voids, and the residual signal strength between these peaks. These three levels are converted in the three-level detector 36 to a standard two-level signal. The clock recovery circuit 38 regenerates the system clock from the incoming optical signal. The two-level signal output of three-level detector 36 is fed into decision circuit 38 with the regenerated system clock such that the optical signal may be demodulated to recover the originally-transmitted digital data stream. Without the effects of FM to AM conversion and the resulting dispersion-induced voids and overlaps as in standard AM or FM transmission, the optical signal reaching receiver 18 would be excessively distorted and not suitable for substantially error-free reconstruction of the original data.

The three-level detector 36 in the exemplary receiver embodiment shown could use two separate two-level detectors to operate on the three incoming levels. One two-level detector would detect energy voids, and the other energy overlaps. Decoding logic would follow the two detectors to combine their outputs into a single two-level data stream. Alternatively, the three-level detector 36 could be implemented as a single integrator instead of two separate two-level detectors. The integrator could operate directly on the three-level optical signal to produce a two-level signal which could be directly input into decision circuit 40. Integrator operation in receivers is well-known and will not be further described herein. It should be noted, however, that the differentiator normally used following an integrator in a receiver would generally be unnecessary in an FM to AM conversion system.

The present invention provides a method of improving FM to AM conversion which utilizes the above-described system and operating regions. The method includes the following steps. Initially, an optical signal transmitter is provided at one end of the optical fiber span. The transmitter supplies, by either direct or indirect modulation of an optical source, a frequency modulated optical signal to the fiber span. An optical signal receiver is also provided at the opposite end of the optical fiber span. The optical receiver receives an optical signal from the fiber span and demodulates the optical signal by detecting amplitude modulation on the optical signal resulting from fiber dispersion-induced energy voids and overlaps. At least one in-line amplifier is provided within the fiber span in order to control fiber nonlinearities. The position of the amplifier or amplifiers is adjusted until optimal performance is obtained. The number of amplifiers used within a given span may also be varied to determine an optimal configuration. The effect of using fewer amplifiers on a given span length, however, may be overcome to a certain extent by increasing the output power of each of the amplifiers.

The term "adjusting" as used herein in the context of the number, position and output power of in-line amplifiers, refers to a variety of adjustment techniques, including physical adjustment of these parameters in an actual system, or simulated adjustment of these parameters in a computer programmed model of optical signal propagation through fiber. As will be discussed below, the equations governing performance of optical fiber communications systems are well known and readily programmed and solved by those skilled in the art, and simulation of system performance may therefore be preferable in many applications. However, it is also possible to vary the number, position and output power of in-line amplifiers by physically hooking up and measuring the performance of various arrangements.

Although in FIG. 1(a) the in-line amplifiers are shown evenly distributed throughout the span, an even distribution is not required. The amplifiers may be placed at a variety of positions between the transmitter and the receiver in order to properly control for the effect of fiber nonlinearities. Similar effects may be obtained for different numbers and positions of in-line amplifiers by adjustments in amplifier output power. However, for ease of construction and implementation, evenly spaced in-line amplifiers are preferable. In applications in which amplifier spacing is determined by factors such as terrain, the advantages of the present invention may still be obtained by an adjustment of amplifier output power.

Figure 3:
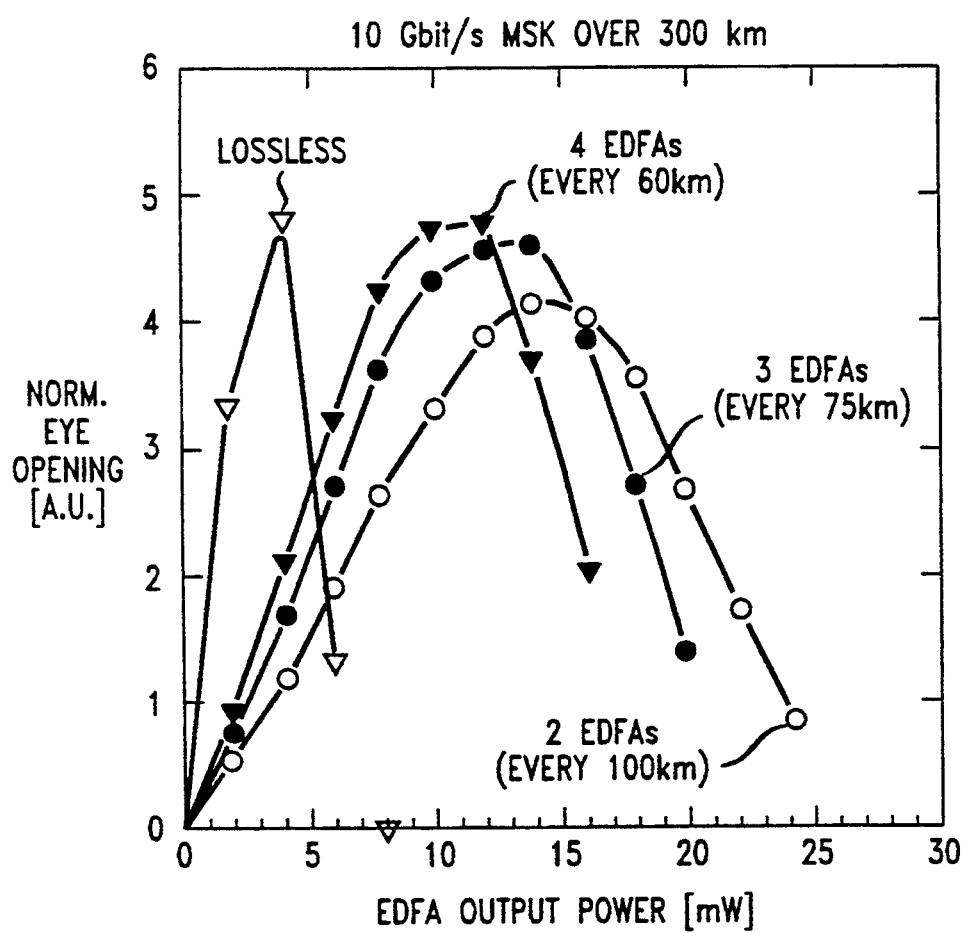
FIG. 3 is a plot of computer simulated performance of the system of FIG. 1(a) showing data quality as a function of in-line fiber amplifier spacing and output power in a 300 km fiber span.

FIG. 3 is a plot of computer simulated performance of the system of FIG. 1(a) showing data quality as a function of in-line fiber amplifier output power. The simulation used a computer programmed model of optical signal transmission, based upon the nonlinear Schrödinger equation describing pulse propagation in optical fiber. Since the equation and techniques for programming and solving it are well known, the details of the computer program used in the simulation will not be further described herein. For the system simulations shown, a fiber span length of 300 km was used. This length is approximately 50% longer than the demonstrated upper limit of prior art FM to AM conversion systems operating at 10 Gbits/sec. The present invention will also provide advantages in system performance for fiber spans having longer or shorter lengths. The 300 km length utilized is one over which a bit error rate of better than $10^{-9}$ is obtained, for purposes of comparison with current systems achieving a similar bit error rate over 200 km. The fiber span length may be increased beyond 300 km, and although the bit error rate of the system may increase, improvements over the results obtained using present techniques will still be provided.

The simulation results shown in FIG. 3 utilize minimum shift keyed (MSK) modulation at 10 Gbits/sec. Although a modulation index of about 0.5 was used, higher and lower modulation indices were also simulated and resulted in no significant improvement in performance. With MSK modulation, the difference in frequency between the two optical signal components which represent each binary data level is the minimum difference necessary to maintain orthogonality between the two signal components. As mentioned above, other digital frequency modulation techniques, such as FSK with modulation indices greater than 0.5, could also be used. With an FSK modulation technique, the frequency spacing between the two optical signals representing the binary data levels will be greater than the frequency spacing used in MSK modulation. Therefore, the limiting distance will be reduced because the larger frequency spacing leads to greater dispersion effects. FM indices greater than 0.5 will therefore generally be used in FM to AM conversion systems transmitting over distances of about 50 to 120 km, while MSK will be used to transmit over distances greater than about 120 km. For transmission distances of less than about 50 km, FM to AM conversion may generally be replaced by standard FM or AM transmission. System performance in FIG. 3 is measured in terms of normalized eye opening. The term eye opening refers to a measure of the separation between high and low data levels across all data in a pseudorandom stream of test data. An open eye indicates a separation between the data levels, which theoretically permits error-free level detection within the receiver. The designation A.U. on the vertical axis of the plot in FIG. 3 refers to arbitrary units. The arbitrary units provide a measure of eye opening corresponding to the measured separation between the lowest value of a high logic state and the highest value of a low logic state. Although any separation between the lowest and highest values will theoretically allow error-free detection in a noise-free system, the amount of separation in a practical system provides an indication of what signal-to-noise performance will be required for substantially error-free transmission. The eye opening measurement in arbitrary units is normalized to the performance of a linear system, where the maximum attainable eye opening is about 5.0 A.U. In the simulation plots discussed below, eye opening therefore may be used as a quantitative measure of system performance by comparing measurements for points on two different curves.

The method of the present invention was simulated on an exemplary 300 km fiber span, by adjusting the number and position of in-line amplifiers, as well as the amplifier output power. System performance was simulated for three different in-line amplifier arrangements. For each arrangement, performance was plotted as a function of amplifier output power. The resulting curves, shown in FIG. 3, indicate that system performance improves as a function of EDFA output power in each configuration. Each of the curves shown exhibits a performance peak at a different amplifier output power level.

For comparison purposes, FIG. 3 includes a curve which shows the performance results for a perfectly lossless line requiring no in-line amplification. The data points are indicated by open triangles. An eye opening of about 4.8 A.U. is obtained for a optical signal power of about 4 mW. It can be seen that performance improves as the booster amp output power is increased up to the optimal output power, but after the optimal power performance degrades as nonlinear effects induce excessive optical signal distortion.

In the first amplifier arrangement, with data points shown as open circles, two in-line amplifiers were evenly spaced about 100 km apart within the 300 km span. System performance in terms of normalized eye opening was measured as a function of the EDFA in-line amplifier output power. It was found that for this case, performance was optimal at an amplifier output power of about 14.5 mW. At this optimal power level, a normalized eye opening of about 4.1 A.U. was obtained. An improvement in performance over the two amplifier case was obtained by using three in-line amplifiers evenly spaced 75 km apart within the 300 km span. The resulting curve, with data points shown as closed circles, exhibited a performance peak of about 4.6 A.U. at about 13.5 mW. A further improvement in performance was obtained by using four in-line amplifiers evenly spaced 60 km apart within the 300 km fiber span. The data points are indicated by closed triangles. In the four amplifier case, a performance peak of about 5.7 A.U. was obtained at an EDFA output power of about 11.5 mW. For each of the three cases shown, therefore, an amplifier output power in the range between about 10 to 15 mW was preferable.

The simulation results of FIG. 3 indicate that the performance curves shift toward the lossless line case as additional amplifiers are added to the system. The inclusion of additional amplifiers would result in optimal performance at lower amplifier output powers. However, the level of performance would not be substantially improved for the 300 km span by using more than four in-line amplifiers, because the optimal performance is already about the same as that of the lossless span, approximately 4.7 A.U. The method of the present invention would therefore indicate the use of four evenly spaced in-line amplifiers, each with an output power of about 11.5 mW, in order to optimize FM to AM conversion on a 300 km fiber span. However, other configurations may be desirable in a given application. For example, the improvement in performance from the three amplifier case to the four amplifier case is between about 0.1 and 0.2 A.U. In certain applications in which component cost is more important than obtaining optimal performance, it may be preferable to use three in-line amplifiers operating at a higher output power level. Similar considerations may lead to the use of only two in-line amplifiers in a given application.

Figure 4:
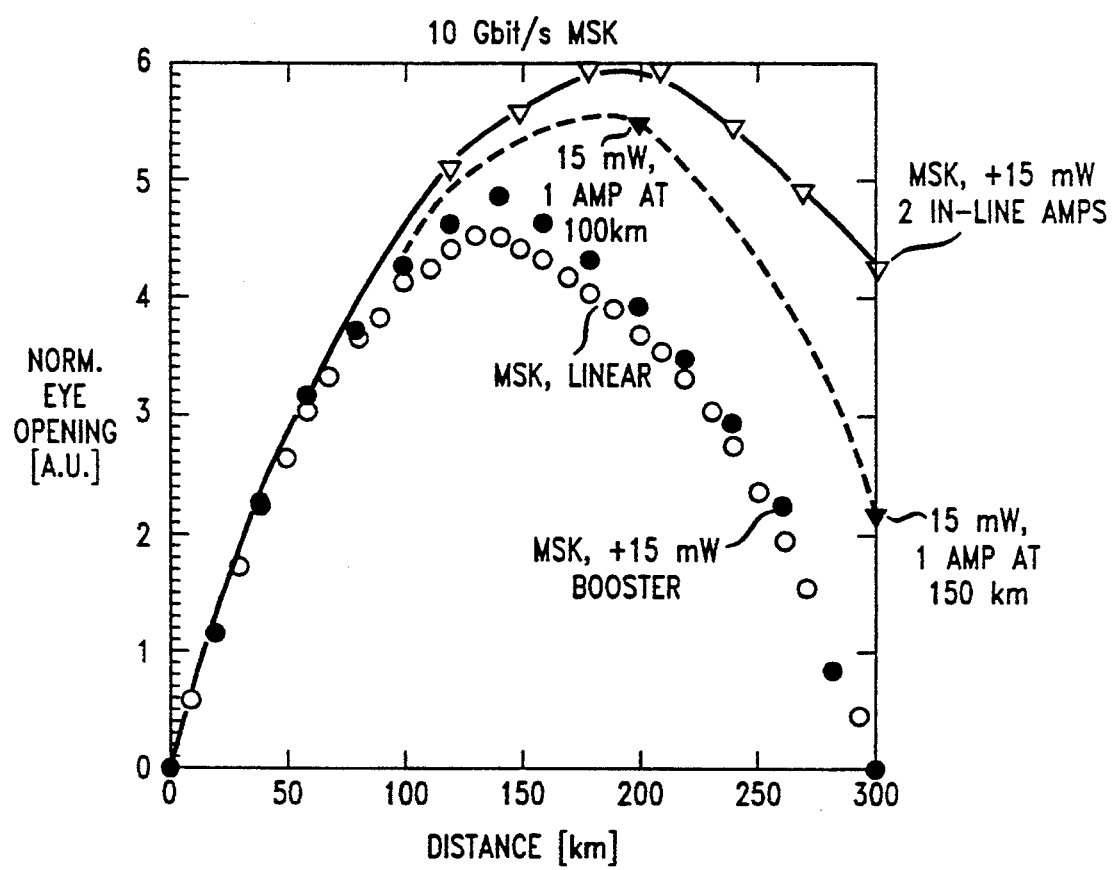
FIG. 4 is a plot of computer simulated performance of an exemplary optical communication system showing data quality as a function of transmission distance in a 300 km fiberspan.

FIG. 4 illustrates the system performance at 10 Gbits/s as a function of fiber span length, or transmission distance. Four curves are shown. The first curve, with data points indicated by open circles, corresponds to MSK frequency modulation in a purely linear FM to AM conversion system. The linear FM to AM conversion curve has a peak performance of 4.5 A.U. at a transmission distance of about 125 km. The curve also indicates performance of about 4.2 A.U. at about 170 km. The effect of using MSK modulation in an FM to AM conversion system with an optical signal power of about 15.0 mW is shown by the second curve, with data points indicated by closed circles. The second curve shows that little improvement is obtained over the purely linear case by raising the optical signal power to 15.0 mW at the booster amplifier output. This is because, as discussed more fully above, the booster amplifier is within the quasi-linear region, where the first order dispersive effects of the fiber dominate. The increase in optical signal power within this region therefore has little effect on the overall performance. The third curve, with data points indicated by closed triangles, shows the performance improvement obtained using a single midspan in-line amplifier with an output power of about 15.0 mW. The first point in the curve corresponds to the placement of an amplifier at the 100 km position in a 200 km fiber span. As shown, an improvement in performance is obtained, but not as significant as that obtained using two in-line amplifiers in a configuration determined in accordance with the present invention. Using a single midspan amplifier in a 300 km span results in the second data point of the curve. Performance as measured by normalized eye opening is only about 2.0, a significant degradation from the two in-line amplifier result discussed below. The curve indicates that systems using a single midspan in-line amplifier are limited to 4.2 A.U. performance at a transmission distance of no more than about 250 km.

The final curve in FIG. 4, with data points corresponding to open triangles, shows the performance of an evenly spaced two in-line amplifier system as a function of transmission distance. It was mentioned above that performance with a two amplifier arrangement was optimized for an amplifier output power of about 15.0 mW. Using this optimal output power value, system performance was simulated as a function of the transmission distance. Optimal performance of about 5.5 A.U. was obtained at a transmission distance of about 190 km. Furthermore, performance of about 4.2 A.U., comparable to that obtained at a maximum distance of 170 km using purely linear FM to AM conversion techniques, was obtained at a distance of 300 km. An improvement in maximum fiber span length of about 130 km is obtained. The present invention thus provides a significant increase in achievable transmission distance at a given bit rate.

Figure 5:
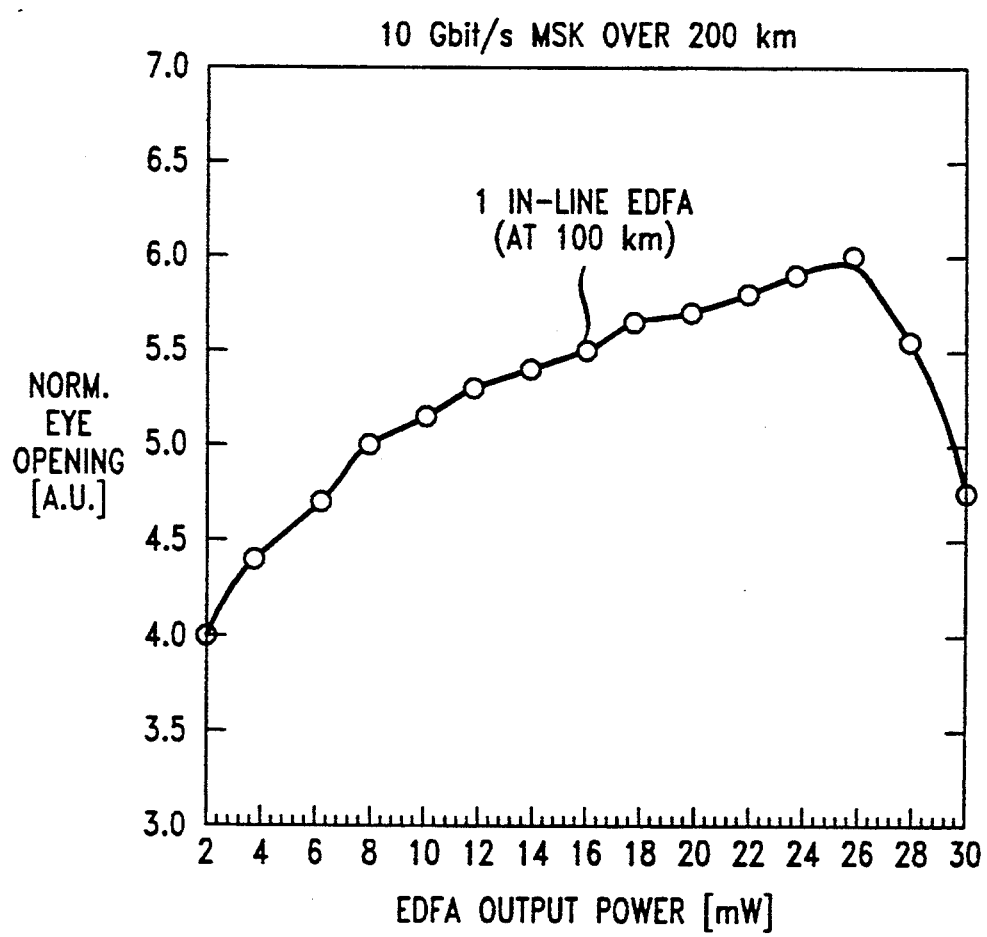
FIG. 5 is a plot of computer simulated performance of an exemplary system showing data quality as a function of in-line amplifier output power for a single in-line amplifier in a 200 km fiber span.

FIG. 5 illustrates the computer simulated performance of another exemplary system, having a single in-line amplifier in a 200 km fiber span. MSK modulation at a modulation index of 0.5 is used. The amplifier position is fixed at the midpoint of the span, at 100 km. Normalized eye opening is shown in A.U. as a function of the output power of the single in-line amplifier. It can be seen that optimal performance in terms of eye opening is obtained for an in-line amplifier output power of about 26 mW. Further improvement in performance may also be obtained by adjusting the position of the single in-line amplifier within the span. FIG. 5 shows that for a given amplifier spacing, performance improvement may be obtained simply by adjusting amplifier output power. FM to AM conversion systems demonstrated to date have not reported use of this adjustment to improve performance for a given spacing.

The achievable transmission distance may be increased in the configurations discussed by an additional fiber length placed in the 2 to 3 region of FIGS. 1(a) and 1(b). For example, FIG. 4 indicates that a two in-line amplifier system operating at 10 Gbits/s over a fiber span of 300 km with an amplifier output power of about 15 mW will yield a normalized eye opening of about 4.2 A.U. If the system receiver can produce a desired system bit error rate with an eye having an A.U. of 4.0, an additional length of fiber may be added to the span. An additional length of about 25 km will cause a further degradation in A.U., but the receiver will still meet the system performance requirements. Total fiber span length is thereby further extended, resulting in a higher bit rate distance product for the system.

In the above description, the same physical medium, dispersive fiber, was typically used in a distributed way to generate the FM to AM conversion and nonlinearity-stabilize the AM. However, it is also possible to spatially separate the processes of FM to AM conversion and nonlinearity-induced stabilization. For example, in a first non-dispersive or low-dispersive fiber, nonlinearity could generate a well-defined FM, and a subsequent conversion of this FM to AM could be effectuated in a second highly dispersive standard fiber. Several stages of these first and second fibers could be cascaded. Furthermore, in place of the highly dispersive standard fiber, a linear dispersive filter could be used. Other variations in the spatial separation of FM to AM conversion and nonlinearity-induced stabilization could also be made.

Although the foregoing detailed description was primarily directed to improved FM to AM conversion in the context of an optical communication system, it should again be emphasized that the embodiments discussed are exemplary only. For example, it has been noted that although the simulated configurations utilized even spacing of in-line amplifiers, alternative spacings could also be used. In accordance with the invention, various system parameters, including but not limited to amplifier number, position and output power, lengths and types of optical fiber, and transmitter/- receiver characteristics, may be altered to suit the needs of a given application. These and other alternatives and variations in the arrangements shown will be readily apparent to those skilled in the art.

We claim:

1. A method of transmitting optical signals through an optical fiber span, said method comprising the steps of:
providing an optical signal transmitter at one end of said optical fiber span for supplying a frequency modulated optical signal to said optical fiber span;
providing an optical signal receiver at an opposite end of said optical fiber span for receiving said frequency modulated optical signal from said optical fiber span;
providing at least one in-line amplifier within said optical fiber span between said transmitter and said receiver;
demodulating said frequency modulated optical signal entering said receiver by detecting amplitude modulation on said optical signal resulting from fiber dispersion-induced energy voids and overlaps in said optical signal; and
selecting a position of said in-line amplifier to stabilize said energy voids and overlaps in said optical signal and thereby improve detection of said amplitude modulation in said receiver.

2. The method of claim 1 further including the step of selecting an output power of at least one of said in-line amplifiers to further stabilize said energy voids and overlaps in said optical signal and thereby further improve detection of said amplitude modulation 3. The method of claim 1 wherein said step of providing at least one in-line amplifier and said step of selecting a position of said in-line amplifier includes providing four in-line amplifiers substantially evenly spaced within said optical fiber span.

4. The method of claim 3 wherein said optical fiber span has a length of about 300 km and said four in-line amplifiers are substantially evenly spaced within said span about 60 km apart.

5. The method of claim 1 wherein said step of providing at least one in-line amplifier and said step of selecting a position of said in-line amplifier includes providing three in-line amplifiers substantially evenly spaced within said optical fiber span.

6. The method of claim 5 wherein said optical fiber span has a length of about 300 km and said three in-line amplifiers are substantially evenly spaced within said span about 75 km apart.

7. The method of claim 1 wherein said step of providing at least one in-line amplifier and said step of selecting a position of said in-line amplifier includes providing two in-line amplifiers substantially evenly spaced within said optical fiber span.

8. The method of claim 7 wherein said optical fiber span has a length of about 300 km and said two in-line amplifiers are substantially evenly spaced within said span about 100 km apart.

9. The method of claim 1 further including the step of adding a length of optical fiber between said receiver and an output of said in-line amplifier closest to said receiver, to provide an increase in a total length of optical fiber in said optical fiber span.

10. The method of claim 2 wherein said step of selecting said output power of at least one of said in-line amplifiers includes selecting an output power of said in-line amplifier in the range between about 10 and 20 milliwatts.

11. An optical communication system comprising:
an optical fiber span;
an optical signal transmitter at one end of said optical fiber span for supplying a frequency modulated optical signal to said optical fiber span;
an optical signal receiver at another end of said optical fiber span for receiving said optical signal from said optical fiber span, said optical signal receiver demodulating said optical signal by detecting amplitude modulation on said optical signal resulting from fiber dispersion-induced energy voids and overlaps in said optical signal; and
at least one in-line amplifier within said optical fiber span between said transmitter and said receiver, at a position selected to stabilize said energy voids and overlaps in said optical signal and thereby improve detection of said amplitude modulation in said receiver.

12. The communication system of claim 11 wherein said in-line amplifier has an output power of about 10 to 20 milliwatts.

13. The communication system of claim 11 including four in-line amplifiers substantially evenly spaced within said optical fiber span.

14. The communication system of claim 13 wherein said optical fiber span has a length of about 300 km and said four in-line amplifiers are substantially evenly spaced about 60 km apart within said span.

15. The communication system of claim 11 including three in-line amplifiers substantially evenly spaced within said optical fiber span.

16. The communication system of claim 15 wherein said optical fiber span has a length of about 300 km and said three in-line amplifiers are substantially evenly spaced about 75 km apart within said span.

17. The communication system of claim 11 including two in-line amplifiers substantially evenly spaced within said optical fiber span.

18. The communication system of claim 17 wherein said optical fiber span has a length of about 300 km and said two in-line amplifiers are substantially evenly spaced about 100 km apart within said span.

19. The communication system of claim 11 further including an additional length of optical fiber between said receiver and an output of said in-line amplifier closest to said receiver, such that a total length of optical fiber in said optical fiber span is increased.

20. The system of claim 11 wherein said optical fiber span includes fiber having a dispersion of about 15 to 20 ps/km-nm.

21. A method of transmitting optical signals through an optical fiber span, said method comprising the steps of:
providing an optical signal transmitter at one end of said optical fiber span for supplying a frequency modulated optical signal to said optical fiber span;
providing an optical signal receiver at an opposite end of said optical fiber span for receiving said frequency modulated optical signal from said optical fiber span;
providing at least one in-line amplifier within said optical fiber span between said transmitter and said receiver;
demodulating said frequency modulated optical signal entering said receiver by detecting amplitude modulation on said optical signal resulting from fiber dispersion-induced energy voids and overlaps in said optical signal; and selecting an output power of said in-line amplifier to stabilize said energy voids and overlaps in said optical signal and thereby improve detection of said amplitude modulation in said receiver.

22. The method of claim 21 further including the step of selecting a position of said in-line amplifier to further stabilize said energy voids and overlaps in said optical signal and thereby further improve detection of said amplitude modulation.

23. The method of claim 21 wherein the step of selecting a position of said in-line amplifier further includes selecting said position such that said in-line amplifier is substantially evenly spaced within said fiber span.

24. The method of claim 21 wherein said step of selecting said output power of said in-line amplifier includes selecting an output power in the range between about 10 and 20 milliwatts.

25. An optical communication system comprising:
an optical fiber span;
an optical signal transmitter at one end of said optical fiber span for supplying a frequency modulated optical signal to said optical fiber span;
an optical signal receiver at another end of said optical fiber span for receiving said optical signal from said optical fiber span, said optical signal receiver demodulating said optical signal by detecting amplitude modulation on said optical signal resulting from fiber dispersion-induced energy voids and overlaps in said optical signal; and
at least one in-line amplifier within said optical fiber span between said transmitter and said receiver, said in-line amplifier having an output power level selected to stabilize said energy voids and overlaps in said optical signal and thereby improve detection of said amplitude modulation in said receiver.

26. The communication system of claim 25 wherein a position of said in-line amplifier within said optical fiber span is selected to further stabilize said energy voids and overlaps in said optical signal.

27. The communication system of claim 25 wherein said in-line amplifier is substantially evenly spaced within said fiber span.

28. The communication system of claim 25 further including a plurality of said in-line amplifiers in positions selected to further stabilize said energy voids and overlaps in said optical signal.

29. The communication system of claim 25 wherein said in-line amplifier is selected to have an output power in the range between about 10 and 20 milliwatts.

* * * * *